J. A. Morrison,
Cooking Utensil.
No. 102,031.        Patented Apr. 19, 1870.
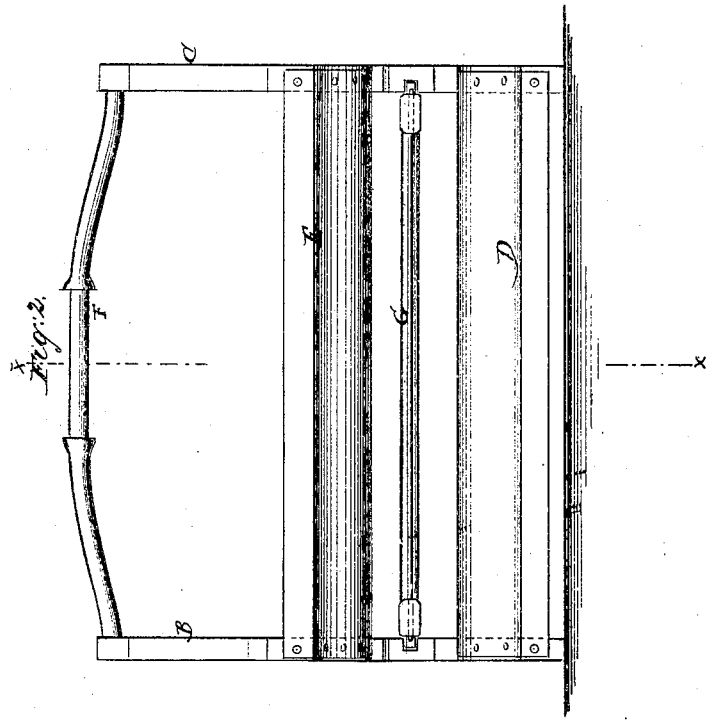
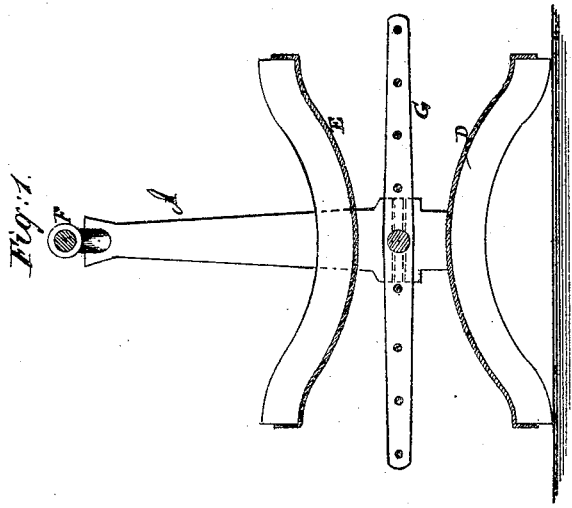
Witnesses:
L. S. Mabu
Alex F. Roberts
Inventor:
J. A. Morrison
Per [signature]
Attorneys.

United States Patent Office.

JAMES A. MORRISON, OF BRADY'S BEND, PENNSYLVANIA, ASSIGNOR TO HIMSELF AND A. J. ELLIOTT, OF SAME PLACE.

Letters Patent No. 102,031, dated April 19, 1870.

COOKING-UTENSIL.

The Schedule referred to in these Letters Patent and making part of the same.

*To all whom it may concern:*

Be it known that I, JAMES A. MORRISON, of Brady's Bend, in the county of Armstrong and State of Pennsylvania, have invented a new and useful Improvement in Cooking-Utensils; and I do hereby declare that the following is a full, clear, and exact description thereof, which will enable others skilled in the art to make and use the same, reference being had to the accompanying drawing forming part of this specification.

The object of this invention is to furnish cheap, ready, and convenient means for toasting bread, broiling or frying meat, or warming vegetables; and It consists in combining with a metallic frame or stand two curved reflectors, one above the other, with their convex sides near and facing each other, and with a toasting or broiling-grate between them, supported by the frame, the concave side of the upper reflector being uppermost and forming a pan for frying, as hereinafter more fully described.

In the accompanying drawing—

Figure 1 is a vertical cross section of the article, on the line $x\ x$ of fig. 2.

Figure 2 represents a front view.

Similar letters of reference indicate corresponding parts.

A is the frame, made of metal, consisting of two stands, B and C, connected together by the lower arch-like reflector D, the upper trough-like reflector E, and the handle F.

G is a toasting-grate, which is supported in grooves in the stands B C, as represented in the drawing.

The reflectors D and E are attached to the arms of the frame or stands by either riveting or soldering, or in any other suitable manner.

By this arrangement bread may be toasting on the grate while vegetables or meats are warming or frying in the pan E.

The article is placed on top of the cooking-stove or range, but may be used to good advantage before a hearth-fire.

It will be observed that the heated air has a free circulation beneath both reflectors and around the toasting-grate; but much of the heat which strikes the bottom of the pan E is reflected back, so that both sides of the bread are toasted at the same time.

The grate may readily be slipped out and turned round, if by so doing the operation of toasting or broiling can be more perfectly performed.

This is a simple and cheap device, and the housewife will readily understand its advantages over the ordinary method of toasting, broiling, and frying, where a variety of articles are necessary to perform the operation.

Having thus described my invention,

I claim as new and desire to secure by Letters Patent—

The frame A, reflectors D and E, and the grate G, constructed, arranged, and combined substantially as and for the purpose herein shown and described.

JAMES A. MORRISON.

Witnesses:
EBENEZER CHRISTY,
JOHN ENGEL.